US012593116B2

(12) United States Patent
Moon et al.

(10) Patent No.: US 12,593,116 B2
(45) Date of Patent: Mar. 31, 2026

(54) IMAGING MEASUREMENT DEVICE USING GAS ABSORPTION IN THE MID-INFRARED BAND AND OPERATING METHOD OF IMAGING MEASUREMENT DEVICE

(71) Applicant: ELECTRONICS AND TELECOMMUNICATIONS RESEARCH INSTITUTE, Daejeon (KR)

(72) Inventors: Youngsun Moon, Daejeon (KR); Young Ahn Leem, Daejeon (KR); Jung-Ho Song, Daejeon (KR)

(73) Assignee: ELECTRONICS and TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 18/983,497

(22) Filed: Dec. 17, 2024

(65) Prior Publication Data

US 2025/0203182 A1 Jun. 19, 2025

(30) Foreign Application Priority Data

Dec. 18, 2023 (KR) ........................ 10-2023-0184884
Dec. 10, 2024 (KR) ........................ 10-2024-0183064

(51) Int. Cl.
*G01S 17/32* (2020.01)
*H04N 13/254* (2018.01)
*H04N 23/20* (2023.01)
(52) U.S. Cl.
CPC ........... *H04N 23/20* (2023.01); *H04N 13/254* (2018.05)

(58) Field of Classification Search
CPC ............................ H04N 23/20; H04N 13/254
See application file for complete search history.

(56) References Cited

U.S. PATENT DOCUMENTS

| | | | | |
|---|---|---|---|---|
| 7,391,795 B2 * | 6/2008 | Yumoto | ................ | G02F 1/3534 |
| | | | | 372/21 |
| 8,332,006 B2 * | 12/2012 | Naganuma | ......... | A61B 5/14532 |
| | | | | 600/316 |
| 9,008,408 B2 * | 4/2015 | Sinbar | ................ | G01N 21/3554 |
| | | | | 382/141 |
| 9,301,710 B2 * | 4/2016 | Mestha | ................ | A61B 5/0064 |
| 10,458,904 B2 * | 10/2019 | Bartholomew | ....... | G01S 7/4812 |
| 10,984,235 B2 * | 4/2021 | Gousev | ................. | G06V 40/18 |
| 11,068,712 B2 * | 7/2021 | Gousev | ............. | G06V 10/7747 |

(Continued)

FOREIGN PATENT DOCUMENTS

| | | |
|---|---|---|
| KR | 10-2020-0095918 A | 8/2020 |
| KR | 10-2596408 B1 | 11/2023 |

*Primary Examiner* — Philip P. Dang
(74) *Attorney, Agent, or Firm* — Sughrue Mion, PLLC

(57) ABSTRACT

Disclosed is an imaging measurement device including a light source unit that emits first light and second light to a target, a capturing unit that detects a first active signal, which is reflected from the target based on the first light, and a second active signal, which is reflected from the target based on the second light, and obtains an active image based on the first active signal, a data processing unit that calculates a distance to the target based on the first active signal and the second active signal, and an image unit that obtains a three-dimensional (3D) image based on the active image and the calculated distance, and displays the 3D image.

15 Claims, 5 Drawing Sheets

(56)  References Cited

U.S. PATENT DOCUMENTS

| | | | |
|---|---|---|---|
| 11,741,700 B2 * | 8/2023 | Satoh | G06F 18/217 |
| | | | 348/222.1 |
| 12,105,196 B2 * | 10/2024 | Shin | G01S 17/42 |
| 2012/0162385 A1 | 6/2012 | Park et al. | |
| 2015/0109603 A1 | 4/2015 | Kim et al. | |
| 2016/0165214 A1 | 6/2016 | Kim | |
| 2022/0308432 A1 * | 9/2022 | Sakata | H04N 9/3182 |
| 2023/0039270 A1 * | 2/2023 | Niwa | G01S 7/493 |

* cited by examiner

IMAGING MEASUREMENT DEVICE USING GAS ABSORPTION IN THE MID-INFRARED BAND AND OPERATING METHOD OF IMAGING MEASUREMENT DEVICE

CROSS-REFERENCE TO RELATED APPLICATIONS

This application claims priority under 35 U.S.C. § 119 to Korean Patent Applications No. 10-2023-0184884 filed on Dec. 18, 2023, and No. 10-2024-0183064 filed on Dec. 10, 2024, in the Korean Intellectual Property Office, the disclosures of which are incorporated by reference herein in their entireties.

BACKGROUND

Embodiments of the present disclosure described herein relate to an imaging measurement device, and more particularly, relate to an imaging measurement device for obtaining a three-dimensional (3D) image by using gas absorption in a mid-infrared band, and an operating method of the imaging measurement device.

Mid-infrared light, which refers to a wavelength band from 3 μm to 50 μm, belongs to the radiant heat band in which all thermal objects emit light. Moreover, the mid-infrared light corresponds to a region that is called a "molecular fingerprint" because the region matches a vibrational frequency band of molecules. Because of these characteristics, the mid-infrared light is used to detect objects or living things in the dark or under conditions of invisibility by thermal imaging cameras or to analyze the molecular composition of materials by using Fourier Transform Infrared (FT-IR) spectroscopy.

Mid-infrared band thermal imaging cameras are used in military situations. When being distinguished by heat, objects and living things may be identified by using the mid-infrared cameras. However, when not being distinguished by heat, objects and living things are incapable of being identified by the mid-infrared cameras, and the distance to objects and living things may be measured by using only other equipment.

SUMMARY

Embodiments of the present disclosure provide an imaging measurement device that reconstructs a 3D image related to a target by using an optical signal of a wavelength band with gas absorption and an optical signal of a wavelength band without gas absorption in the mid-infrared band, and an operating method of the imaging measurement device.

According to an embodiment, an imaging measurement device includes a light source unit that emits first light and second light to a target, a capturing unit that detects a first active signal, which is reflected from the target based on the first light, and a second active signal, which is reflected from the target based on the second light, and obtains an active image based on the first active signal, a data processing unit that calculates a distance to the target based on the first active signal and the second active signal, and an image unit that obtains a three-dimensional (3D) image based on the active image and the calculated distance, and displays the 3D image. The first light is included in a wavelength band, in which there is no absorption of a gas in a mid-infrared band, and the second light is included in a wavelength band in which the absorption of the gas is present in the mid-infrared band.

For example, the data processing unit calculates the distance based on the first active signal, the second active signal, and an absorption coefficient of the gas.

For example, the data processing unit calculates the absorption coefficient based on concentration of the gas in an atmosphere.

For example, the data processing unit normalizes intensity of each of the first active signal and the second active signal, and the data processing unit calculates the distance based on Equation 1:

$$\ln\frac{I2}{I1} = -2 \cdot a \cdot l \qquad \text{[Equation 1]}$$

In Equation 1, the I1 denotes the normalized first active signal, the I2 denotes the normalized second active signal, the 'a' denotes the absorption coefficient, and the 'l' denotes the distance.

For example, the light source unit emits the first light during a first time and emits the second light during a second time after the first time.

For example, the light source unit includes a first light source that emits the first light, a second light source that emits the second light, a first reflector that reflects the emitted second light, a second reflector that reflects light reflected from the first reflector, and a beam expander that expands light reflected from the second reflector and the emitted first light.

For example, during the first time, the second reflector is flipped to be parallel to a traveling direction of the first light.

For example, the light source unit includes a light source that emits the first light during the first time and emits the second light during the second time, and a beam expander that expands light emitted from the light source.

For example, the gas is one of carbon monoxide or carbon dioxide.

For example, the capturing unit further detects a passive signal based on a temperature of the target, and the data processing unit obtains the 3D image based on the passive signal, the active image, and the calculated distance.

For example, the capturing unit consists of a mid-infrared camera.

According to an embodiment, an operating method of an imaging measurement device includes emitting first light and second light to a target, the first light being included in a wavelength band, in which there is no absorption of a gas in a mid-infrared band, and the second light being included in a wavelength band in which the absorption of the gas is present in the mid-infrared band, detecting a first active signal and a second active signal, which are reflected from the target, the first active signal being related to the first light, and the second active signal being related to the second light, obtaining an active image based on the first active signal, calculating a distance to the target based on the first active signal and the second active signal, and obtaining a 3D image based on the active image and the calculated distance.

For example, the calculating of the distance to the target based on the first active signal and the second active signal includes calculating an absorption coefficient based on concentration of the gas in an atmosphere, and calculating the distance based on the first active signal, the second active signal, and the absorption coefficient of the gas.

For example, the calculating of the distance based on the first active signal, the second active signal, and the absorption coefficient of the gas includes normalizing intensity of each of the first active signal and the second active signal, and calculating the distance based on Equation 2:

$$\ln\frac{I2}{I1} = -2 \cdot a \cdot l \qquad \text{[Equation 2]}$$

In Equation 2, the I1 denotes the normalized first active signal, the I2 denotes the normalized second active signal, the 'a' denotes the absorption coefficient, and the 'l' denotes the distance.

For example, the emitting of the first light and the second light to the target includes emitting the first light during a first time, and emitting the second light during a second time after the first time.

For example, the imaging measurement device includes a light source unit. The light source unit includes a first light source that emits the first light, a second light source that emits the second light, a first reflector that reflects the emitted second light, a second reflector that reflects light reflected from the first reflector, and a beam expander that expands light reflected from the second reflector and the emitted first light.

For example, the imaging measurement device includes a light source unit. The light source unit includes a light source that emits the first light during the first time and emits the second light during the second time, and a beam expander that expands light emitted from the light source.

For example, the gas is one of carbon monoxide or carbon dioxide.

For example, the detecting of the first active signal and the second active signal, which are reflected from the target, includes detecting a passive signal based on a temperature of the target. The obtaining of the 3D image based on the active image and the calculated distance includes obtaining the 3D image based on the passive signal, the active image, and the calculated distance.

For example, the operating method further includes displaying the 3D image.

BRIEF DESCRIPTION OF THE FIGURES

The above and other objects and features of the present disclosure will become apparent by describing in detail embodiments thereof with reference to the accompanying drawings.

DETAILED DESCRIPTION

Below, embodiments of the present disclosure will be described in detail and clearly to such an extent that an ordinary one in the art easily implements the present disclosure.

In the detailed description, components described with reference to the terms "unit", "module", "block", "~er or ~or", etc. and function blocks illustrated in drawings will be implemented with software, hardware, or a combination thereof. For example, the software may be a machine code, firmware, an embedded code, and application software. For example, the hardware may include an electrical circuit, an electronic circuit, a processor, a computer, an integrated circuit, integrated circuit cores, a pressure sensor, an inertial sensor, a microelectromechanical system (MEMS), a passive element, or a combination thereof.

Figure 1:
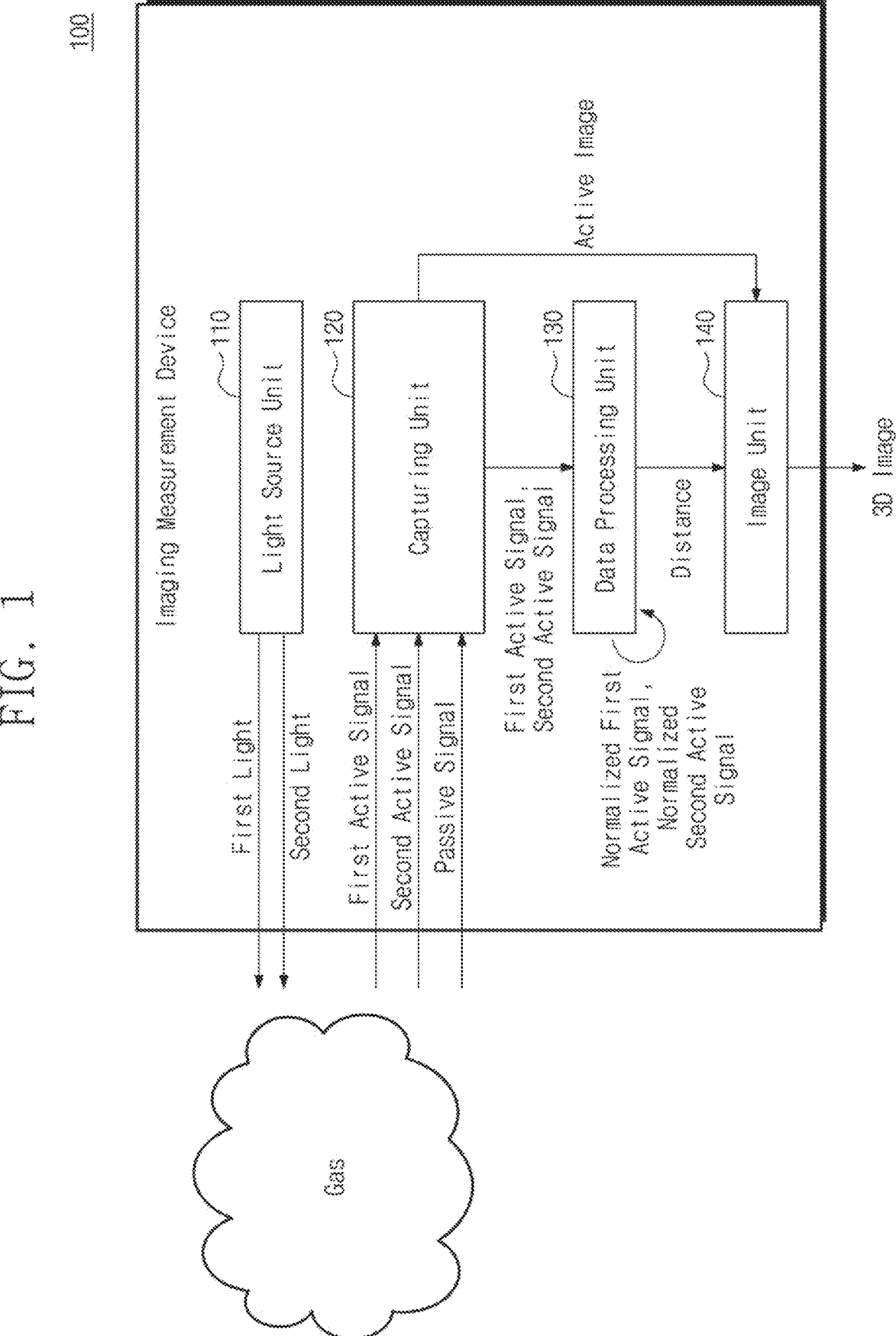
FIG. 1 shows an imaging measurement device, according to an embodiment of the present disclosure.

FIG. 1 shows an imaging measurement device, according to an embodiment of the present disclosure. Referring to FIG. 1, an imaging measurement device 100 may include a light source unit 110, a capturing unit 120, a data processing unit 130, and an image unit 140.

The light source unit 110 may emit light in a mid-infrared band to a target. For example, the light source unit 110 may emit first light and second light to the target. In this case, the first light may be included in a wavelength band where there is no gas absorption in the mid-infrared band, and the second light may be included in a wavelength band where there is gas absorption in the mid-infrared band. That is, wavelengths of the first light and second light may be different from each other.

In an embodiment, the first light may be a reference signal for calculating the distance to the target.

In an embodiment, a gas that serves as a criterion for determining whether a gas is absorbed may be a gas, which is distributed in the atmosphere and whose concentration is known. For example, the gas may be carbon dioxide having an absorption band of 4.2 μm to 4.4 μm or carbon monoxide having an absorption band of 4.5 μm to 4.8 μm.

The light source unit 110 may adjust the intensity of light based on the distance to the target or an object to be measured.

The capturing unit 120 may receive or detect an optical signal from the target. For example, the capturing unit 120 may detect a first active signal, which is an optical signal reflected by the target from the first light, and may detect a second active signal, which is an optical signal reflected by the target from the second light.

In an embodiment, the light amount of the first active signal may be different from the light amount of the second active signal. In detail, the second active signal may be reduced by absorption of the gas.

The capturing unit 120 may obtain an active image based on the detected signal. For example, the capturing unit 120 may obtain an active image based on the first active signal thus detected.

In an embodiment, the capturing unit 120 may detect the heat of the target. For example, the capturing unit 120 may detect a passive signal caused by the heat of the target. The passive signal may be a signal detected regardless of light emitted from the light source unit 110. The capturing unit 120 may continuously detect the passive signal from the target. The capturing unit 120 may identify the target by detecting the passive signal.

In an embodiment, the capturing unit 120 may include a mid-infrared camera. For example, the capturing unit 120 may consist of the mid-infrared camera.

The data processing unit 130 may calculate a distance to the target based on signals detected from the capturing unit 120. For example, the data processing unit 130 may calculate the distance to the target based on a difference between first data (e.g., the sum of pieces of intensity or amounts of light of the passive signal, the first active signal, and the second active signal) based on signals, which are detected after light is emitted, and second data (e.g., the intensity or amount of light of the passive signal) based on signals detected before the light is emitted. In other words, the data processing unit 130 may calculate the distance to the target on the basis of data based on active signals. Hereinafter, for convenience of description, the difference between the first data and the second data may be referred to as an "active imaging value".

The data processing unit 130 may calculate the distance to the target based on the active imaging value by using Equation 1 below.

$$\ln\frac{I2}{I1} = -2 \cdot a \cdot l \qquad \text{[Equation 1]}$$

Here, in Equation 1, I1 may denote a first active signal thus normalized; I2 may denote a second active signal thus normalize; 'a' may denote an absorption coefficient of a gas; and, 'l' may denote the distance from the target.

In an embodiment, the data processing unit 130 may normalize the intensity of each of the first active signal and the second active signal. For example, the data processing unit 130 may normalize the intensity of the first active signal based on the intensity of the first light, and may normalize the intensity of the second active signal based on the intensity of the second light. That is, the data processing unit 130 may normalize the intensity of light of each of the first and second active signals included in the active imaging value as the intensity of light immediately after light is emitted from a light source.

In an embodiment, the data processing unit 130 may calculate the absorption coefficient of a gas. For example, the absorption coefficient of a gas may vary depending on the concentration of the gas in the atmosphere. The data processing unit 130 may calculate the absorption coefficient of a gas based on the gas concentration at any location and any time point.

In an embodiment, the data processing unit 130 may be configured to measure gas concentration at any location and any time point.

The image unit 140 may obtain a 3D image according to distance values of all pixels based on the active image obtained by the capturing unit 120 and the distance calculated by the data processing unit 130. The image unit 140 may display the obtained 3D image.

In an embodiment, the image unit 140 may display only the distance of a specific area.

Figure 2:
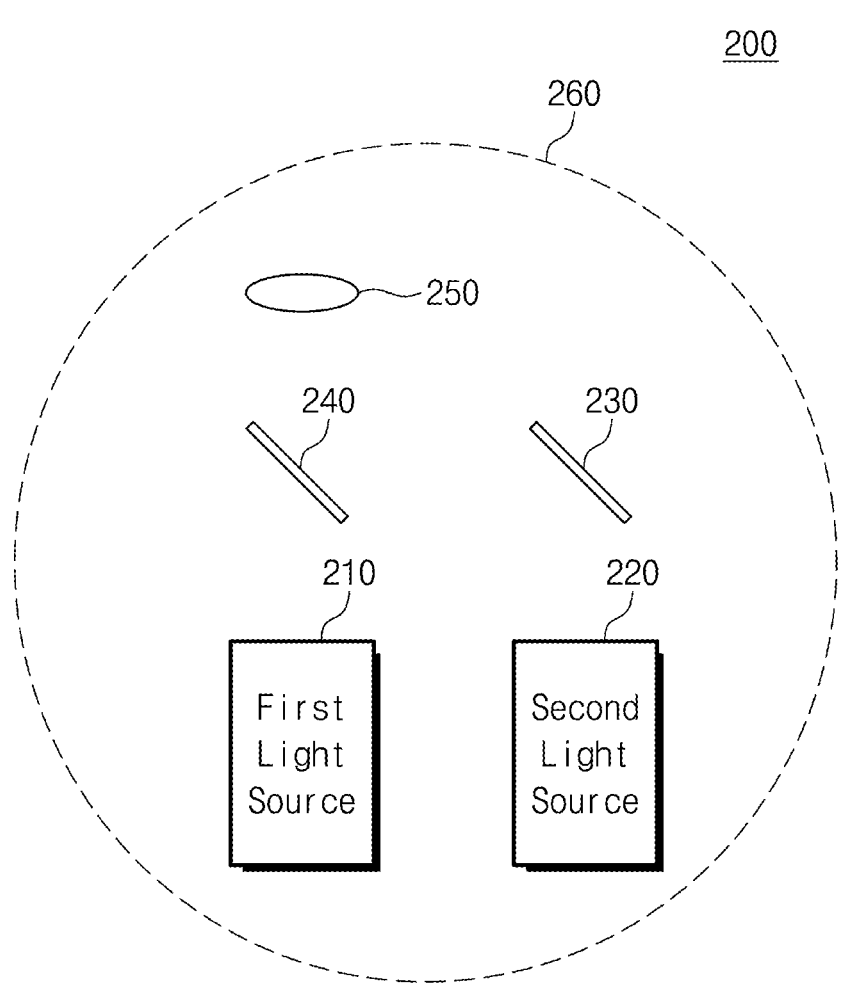
FIG. 2 shows an example of the light source unit of FIG. 1.

FIG. 2 shows an example of the light source unit of FIG. 1. Referring to FIGS. 1 and 2, a light source unit 200 may include a first light source 210, a second light source 220, a first reflector 230, a second reflector 240, and a beam expander 250.

The first light source 210 may emit first light in a wavelength band where there is no gas absorption in a mid-infrared band. For example, the first light source 210 may emit the first light to the beam expander 250. In this case, the second reflector 240 may be flipped or rotated such that it is parallel to the traveling direction of the first light. The first light may be used to obtain an active image. In an embodiment, the first light source 210 may emit the first light during a first time.

The second light source 220 may emit second light in a wavelength band where gas absorption occurs in the mid-infrared band. For example, the second light source 220 may emit the second light to the first reflector 230. In an embodiment, the second light source 220 may emit the second light during a second time after the first time.

The first reflector 230 may deliver the second light to the second reflector 240 by reflecting the second light emitted from the second light source 220.

The second reflector 240 may be flipped or rotated such that the first light emitted from the first light source 210 is delivered to the beam expander 250. Alternatively, the second reflector 240 may reflect light delivered from the first reflector 230 and then may deliver the light to the beam expander 250. In an embodiment, the second reflector 240 may be referred to as a "flip mirror".

The beam expander 250 may expand the received light and may emit the expanded light to a target. For example, the beam expander 250 may receive the first light from the first light source 210, may expand the received light, and may deliver the expanded light to the target. The beam expander 250 may receive light from the second reflector 240, may expand the received light, and may deliver the expanded light to the target.

In an embodiment, each of the first light source 210 and the second light source 220 may be implemented as either a short-wavelength light source or a multi-wavelength light source. For example, when at least one of the first light source 210 and the second light source 220 is implemented as a short-wavelength light source, the wavelength of the short-wavelength light source may be variable.

In an embodiment, the light source unit 200 may include a moving support 260. The first light source 210, the second light source 220, the first reflector 230, the second reflector 240, and the beam expander 250 may be fixed on the moving support 260. The moving support 260 may be moved to emit light to the desired area. In an embodiment, the moving support 260 may be implemented as a hexapod.

As described above, the light source unit 200 may alternately emit multi-wavelength light sources (e.g., the first light and the second light) at different times. Furthermore, the light source unit 200 may be configured to share the same optical system by expanding light by using the same beam expander 250.

Figure 3A:
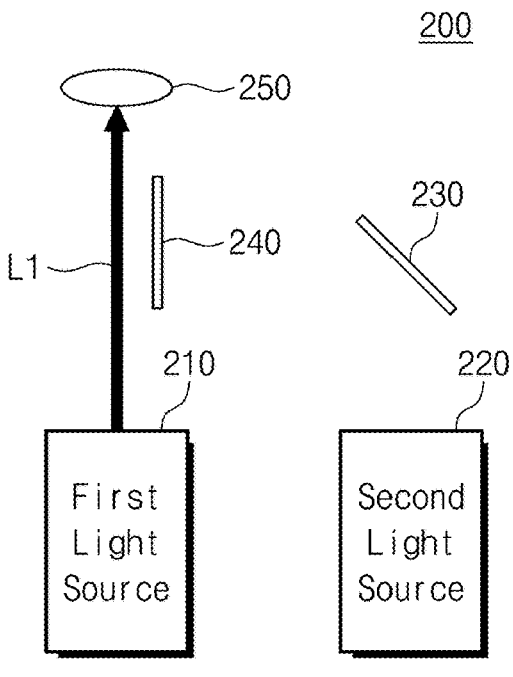
FIGS. 3A and 3B show examples of an operation of the light source unit of FIG. 2.
Figure 3B:
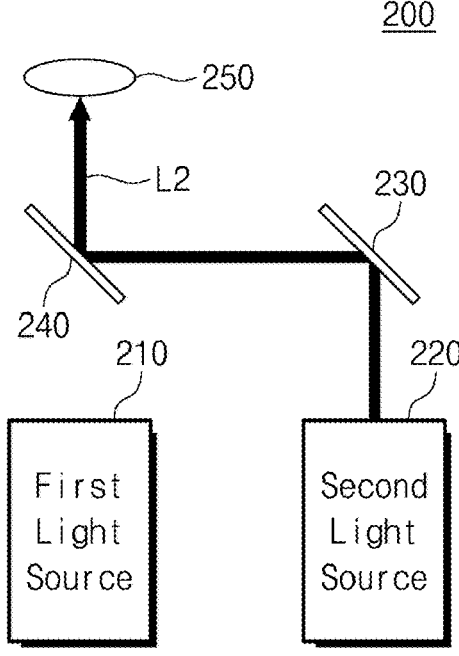

FIGS. 3A and 3B show examples of an operation of the light source unit of FIG. 2. Referring to FIGS. 2 to 3B, the light source unit 200 may emit first light and second light with different wavelengths at different times.

In FIG. 3A, the first light source 210 may emit first light L1 to the beam expander 250 during a first time. In this case, the second reflector 240 may be flipped or rotated in a direction parallel to the traveling direction of the first light L1. That is, the second reflector 240 may be flipped or rotated in a direction parallel to the traveling direction of the first light L1 such that the first light L1 passes. Accordingly, the first light L1 may be delivered from the first light source 210 to the beam expander 250.

In FIG. 3B, the second light source 220 may emit second light L2 to the first reflector 230 during a second time after the first time. The first reflector 230 may reflect the second light L2 emitted from the second light source 220 to the second reflector 240. The second reflector 240 may be flipped or rotated to reflect light reflected from the first reflector 230 to the beam expander 250.

Figure 4:
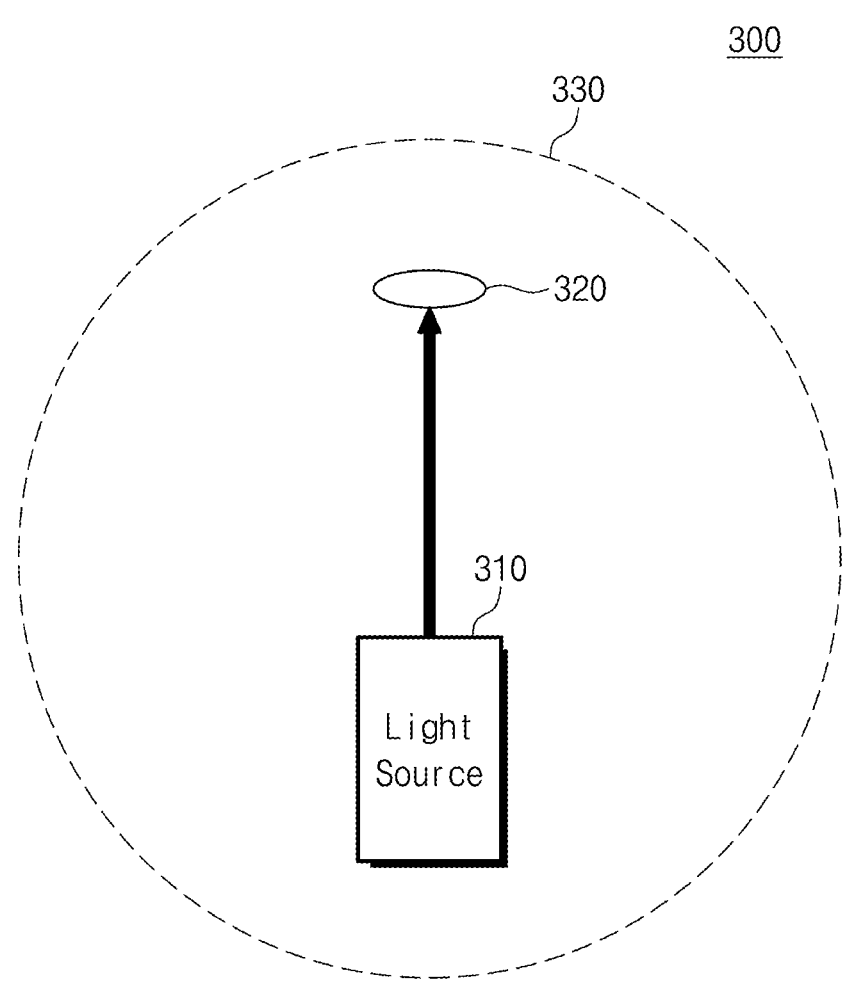
FIG. 4 shows an example of the light source unit of FIG. 1.

FIG. 4 shows an example of the light source unit of FIG. 1. Referring to FIGS. 1 and 4, a light source unit 300 may include a light source 310 and a beam expander 320.

The light source 310 may alternately emit first light in a wavelength band, in which there is no absorption of a gas in a mid-infrared band, and second light in a wavelength band in which there is absorption of the gas in the mid-infrared band. For example, the first light source 310 may emit first light in a wavelength band where there is no gas absorption in the mid-infrared band. The light source 310 may emit second light in a wavelength band, where the gas is absorbed, during a second time after the first time.

The beam expander 320 may expand light emitted from the light source 310 and may deliver the expanded light to the target.

In an embodiment, the light source 310 may be implemented as either a short-wavelength light source or a multi-wavelength light source. For example, when the light source 310 is implemented as a short-wavelength light source, the wavelength of the short-wavelength light source may be variable.

In an embodiment, the light source unit 300 may include a moving support 330. The light source 310 and the beam expander 320 may be fixed on the moving support 330. The moving support 330 may be moved to emit light to the desired area. In an embodiment, the moving support 330 may be implemented as a hexapod.

Figure 5:
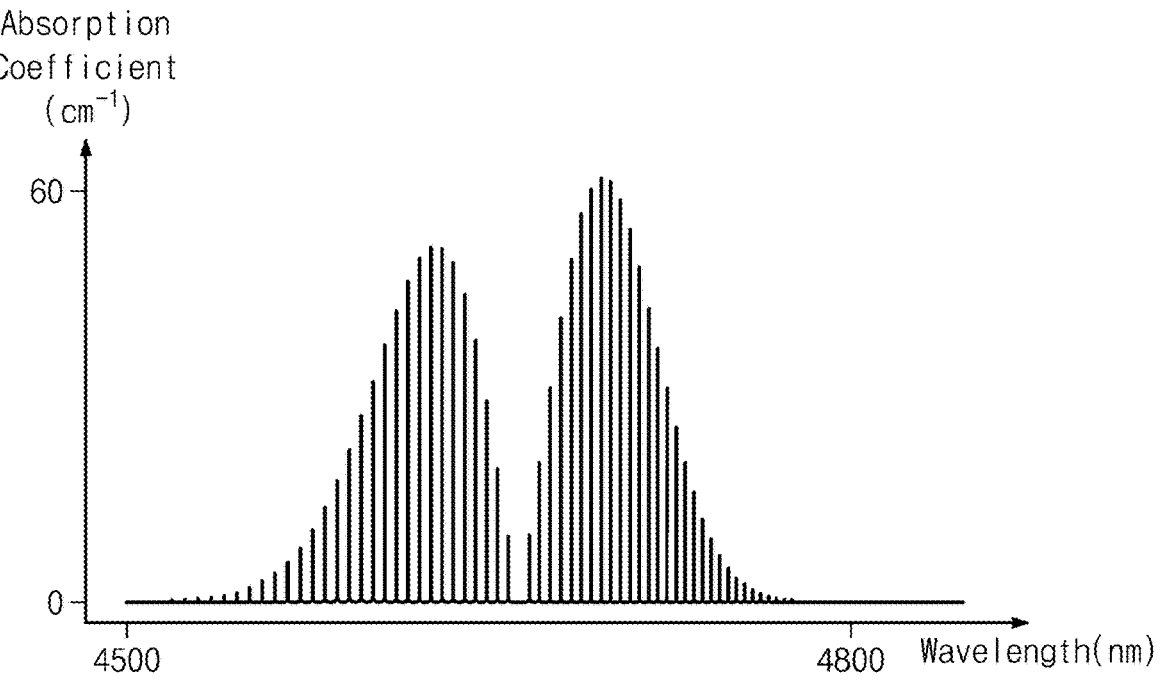
FIG. 5 shows an example of a wavelength band in which there is absorption of a gas in a mid-infrared band, according to an embodiment of the present disclosure.

FIG. 5 shows an example of a wavelength band in which there is absorption of a gas in a mid-infrared band, according to an embodiment of the present disclosure. In FIG. 5, a horizontal axis represents a wavelength, and a vertical axis represents an absorption coefficient of carbon monoxide.

Referring to FIGS. 1 and 5, a wavelength (hereinafter referred to as an "absorption wavelength") at which absorption by carbon monoxide occurs may be spaced apart from an absorption band between 4.5 μm and 4.8 μm by any spectral line width. That is, a plurality of absorption wavelengths may be present in an absorption band.

When the imaging measurement device 100 uses a short-wavelength light source, the imaging measurement device 100 may select and use a wavelength band that includes the absorption wavelength. In this case, the imaging measurement device 100 may calculate the distance to a target by using an average value between pixels within a specific area in an active image as a data value.

When the imaging measurement device 100 uses a multi-wavelength light source, the imaging measurement device 100 may use a wavelength band that includes various absorption coefficients.

Figure 6:
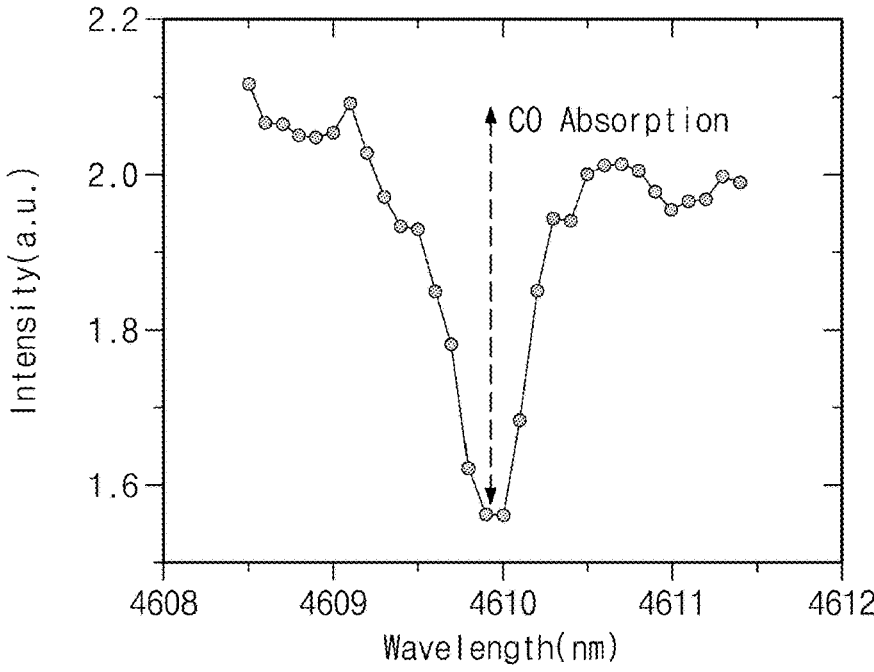
FIG. 6 shows an example of a detection result of a capturing unit, according to an embodiment of the present disclosure.

FIG. 6 shows an example of a detection result of a capturing unit, according to an embodiment of the present disclosure. In FIG. 6, a horizontal axis represents a wavelength, and a vertical axis represents the intensity of a signal detected by the capturing unit 120. In FIG. 6, it is assumed that a distance to a target is 50 m.

Referring to FIGS. 1, 3, and 6, carbon monoxide may have an absorption wavelength of 4610 nm in a wavelength band between 4608 nm and 4612 nm.

The imaging measurement device 100 may calculate the distance to the target based on first light of a wavelength band between 4608 nm and 4612 nm, in which there is no absorption of a gas, and second light having the wavelength of 4610 nm in which there is absorption of the gas. In FIG. 6, the wavelength band without gas absorption as a reference signal may be a wavelength band that does not overlap a wavelength band with gas absorption in FIG. 3.

In the above embodiments, components according to the present disclosure are described by using the terms "first", "second", "third", etc. However, the terms "first", "second", "third", etc. may be used to distinguish components from each other and do not limit the present disclosure. For example, the terms "first", "second", "third", etc. do not involve an order or a numerical meaning of any form.

The above-mentioned description refers to embodiments for implementing the scope of the present disclosure. Embodiments in which a design is changed simply or which are easily changed may be included in the scope of the present disclosure as well as an embodiment described above. In addition, technologies that are easily changed and implemented by using the above-mentioned embodiments may be also included in the scope of the present disclosure.

According to an embodiment of the present disclosure, an imaging measurement device may identify the distance to an enemy with or without a heat difference through a 3D image in military situations.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An imaging measurement device comprising:
   a light source configured to emit first light and second light to a target;
   a camera configured to detect a first active signal, which is reflected from the target based on the first light, and a second active signal, which is reflected from the target based on the second light, and to obtain an active image based on the first active signal;
   at least one processor configured to calculate a distance to the target based on the first active signal and the second active signal; and
   a display configured to obtain a three-dimensional (3D) image based on the active image and the calculated distance, and to display the 3D image,
   wherein the first light is included in a wavelength band, in which there is no absorption of a gas in a mid-infrared band, and the second light is included in a wavelength band in which the absorption of the gas is present in the mid-infrared band,
   wherein the at least one processor is further configured to:
      calculate the distance based on the first active signal, the second active signal, and an absorption coefficient of the gas;
      calculate the absorption coefficient based on a concentration of the gas in an atmosphere;
      normalize an intensity of each of the first active signal and the second active signal; and
      calculate the distance based on Equation 1:

$$\ln\frac{I2}{I1} = -2 \cdot a \cdot l,$$

and
   wherein in the Equation 1, the I1 denotes the normalized first active signal, the I2 denotes the normalized second active signal, the 'a' denotes the absorption coefficient, and the 'l' denotes the distance.

2. The imaging measurement device of claim 1, wherein the light source is further configured to emit the first light during a first time and emit the second light during a second time after the first time.

3. The imaging measurement device of claim 2, wherein the light source comprises:
   a first light source configured to emit the first light;
   a second light source configured to emit the second light;

a first reflector configured to reflect the emitted second light;

a second reflector configured to reflect light reflected from the first reflector; and a beam expander configured to expand light reflected from the second reflector and the emitted first light.

4. The imaging measurement device of claim 3, wherein during the first time, the second reflector is flipped to be parallel to a traveling direction of the first light.

5. The imaging measurement device of claim 2, wherein the light source comprises:

a first light source configured to emit the first light during the first time and to emit the second light during the second time; and a beam expander configured to expand light emitted from the light source.

6. The imaging measurement device of claim 1, wherein the gas is one of carbon monoxide or carbon dioxide.

7. The imaging measurement device of claim 1, wherein the camera is further configured to detect a passive signal based on a temperature of the target, and wherein the at least one processor is further configured to calculate the distance based on the passive signal, the first active signal, and the second active signal.

8. The imaging measurement device of claim 7, wherein the camera consists of a mid-infrared camera.

9. An operating method of an imaging measurement device, the method comprising:

emitting first light and second light to a target, wherein the first light is included in a wavelength band, in which there is no absorption of a gas in a mid-infrared band, and the second light is included in a wavelength band in which the absorption of the gas is present in the mid-infrared band;

detecting a first active signal and a second active signal, which are reflected from the target, wherein the first active signal is related to the first light, and the second active signal is related to the second light;

obtaining an active image based on the first active signal;

calculating a distance to the target based on the first active signal and the second active signal; and obtaining a three-dimensional (3D) image based on the active image and the calculated distance, wherein the calculating of the distance to the target based on the first active signal and the second active signal comprises:

calculating an absorption coefficient based on a concentration of the gas in an atmosphere; and calculating the distance based on the first active signal, the second active signal, and the absorption coefficient of the gas, wherein the calculating the distance based on the first active signal, the second active signal, and the absorption coefficient of the gas comprises:

normalizing an intensity of each of the first active signal and the second active signal; and calculating the distance based on Equation 2:

$$\ln\frac{I2}{I1} = -2 \cdot a \cdot l,$$

and wherein in the Equation 2, the I1 denotes the normalized first active signal, the I2 denotes the normalized second active signal, the 'a' denotes the absorption coefficient, and the 'l' denotes the distance.

10. The method of claim 9, wherein the emitting of the first light and the second light to the target comprises:

emitting the first light during a first time; and emitting the second light during a second time after the first time.

11. The method of claim 10, wherein the imaging measurement device comprises a light source, wherein the light source comprises:

a first light source configured to emit the first light;

a second light source configured to emit the second light;

a first reflector configured to reflect the emitted second light;

a second reflector configured to reflect light reflected from the first reflector; and a beam expander configured to expand light reflected from the second reflector and the emitted first light.

12. The method of claim 10, wherein the imaging measurement device comprises a light source, wherein the light source comprises:

a first light source configured to emit the first light during the first time and to emit the second light during the second time; and a beam expander configured to expand light emitted from the light source.

13. The method of claim 9, wherein the gas is one of carbon monoxide or carbon dioxide.

14. The method of claim 9, wherein the detecting of the first active signal and the second active signal, which are reflected from the target, comprises:

detecting a passive signal based on a temperature of the target, and wherein the obtaining of the 3D image based on the active image and the calculated distance comprises:

obtaining the 3D image based on the passive signal, the active image, and the calculated distance.

15. The method of claim 9, further comprising:

displaying the 3D image.

* * * * *